United States Patent [19]

Bodlaj

[11] 4,192,612

[45] * Mar. 11, 1980

[54] DEVICE FOR CONTACT-FREE THICKNESS MEASUREMENT

[75] Inventor: Viktor Bodlaj, Munich, Fed. Rep. of Germany

[73] Assignee: Siemens Aktiengesellschaft, Berlin & Munich, Fed. Rep. of Germany

[ * ] Notice: The portion of the term of this patent subsequent to Jan. 17, 1995, has been disclaimed.

[21] Appl. No.: 856,005

[22] Filed: Nov. 30, 1977

Related U.S. Application Data

[63] Continuation-in-part of Ser. No. 647,669, Jan. 9, 1976, Pat. No. 4,068,955.

[30] Foreign Application Priority Data

Dec. 1, 1976 [DE] Fed. Rep. of Germany ....... 2654478

[51] Int. Cl.$^2$ ............................................. G01B 11/06
[52] U.S. Cl. .................................... 356/381; 250/224; 250/560; 356/1
[58] Field of Search ................... 356/167, 156, 1, 4–5; 250/560, 578

[56] References Cited

U.S. PATENT DOCUMENTS

| | | | |
|---|---|---|---|
| 3,536,405 | 10/1970 | Flower | 356/167 |
| 3,821,558 | 6/1974 | Mansfield | 356/167 |
| 4,053,227 | 10/1977 | Bodlaj | 356/5 |
| 4,068,955 | 1/1978 | Bodlaj | 356/167 |

FOREIGN PATENT DOCUMENTS

1068473 11/1959 Fed. Rep. of Germany .
1392325 4/1975 United Kingdom .

OTHER PUBLICATIONS

Bodlaj, Dr. V. "Thickness, Distance & Velocity Measurements from Objects with the Aid of a Piezoelectric Laser Beam Deflector" Mess. & Prüf. (Germany) #12, 1972, pp. 778–782.

*Primary Examiner*—John K. Corbin
*Assistant Examiner*—Wm. H. Punter
*Attorney, Agent, or Firm*—Hill, Van Santen, Steadman, Chiara & Simpson

[57] ABSTRACT

A device is disclosed for the contact free thickness measurement of an object. A light source produces a sharply bundled light ray which is divided into two light rays and simultaneously and periodically deflected so as to scan over opposite surfaces of the object. A reference detector determines a time $t_O$ at which two rays corresponding to a zero position of the light deflector strike the object. A first detector picks up light only along a first sighting line which intersects the object at a first point on one surface thereof. This first detector detects a time $t_A$ when one of the two light rays scans across the first point. A second detector picks up light only along a second sighting line which intersects the object at a second point on the one surface thereof. The second detector detects a time $t_B$ when the one light ray scans across the second point. A third detector is provided for picking up light only along a third sighting line which intersects the object at a third point on the opposite surface thereof. The third detector detects a third time $t_C$ when the other light ray scans across the third point. A measuring device is provided for computing distances of the first, second, and third points from a reference plane and for computing a thickness of the object therefrom.

9 Claims, 1 Drawing Figure

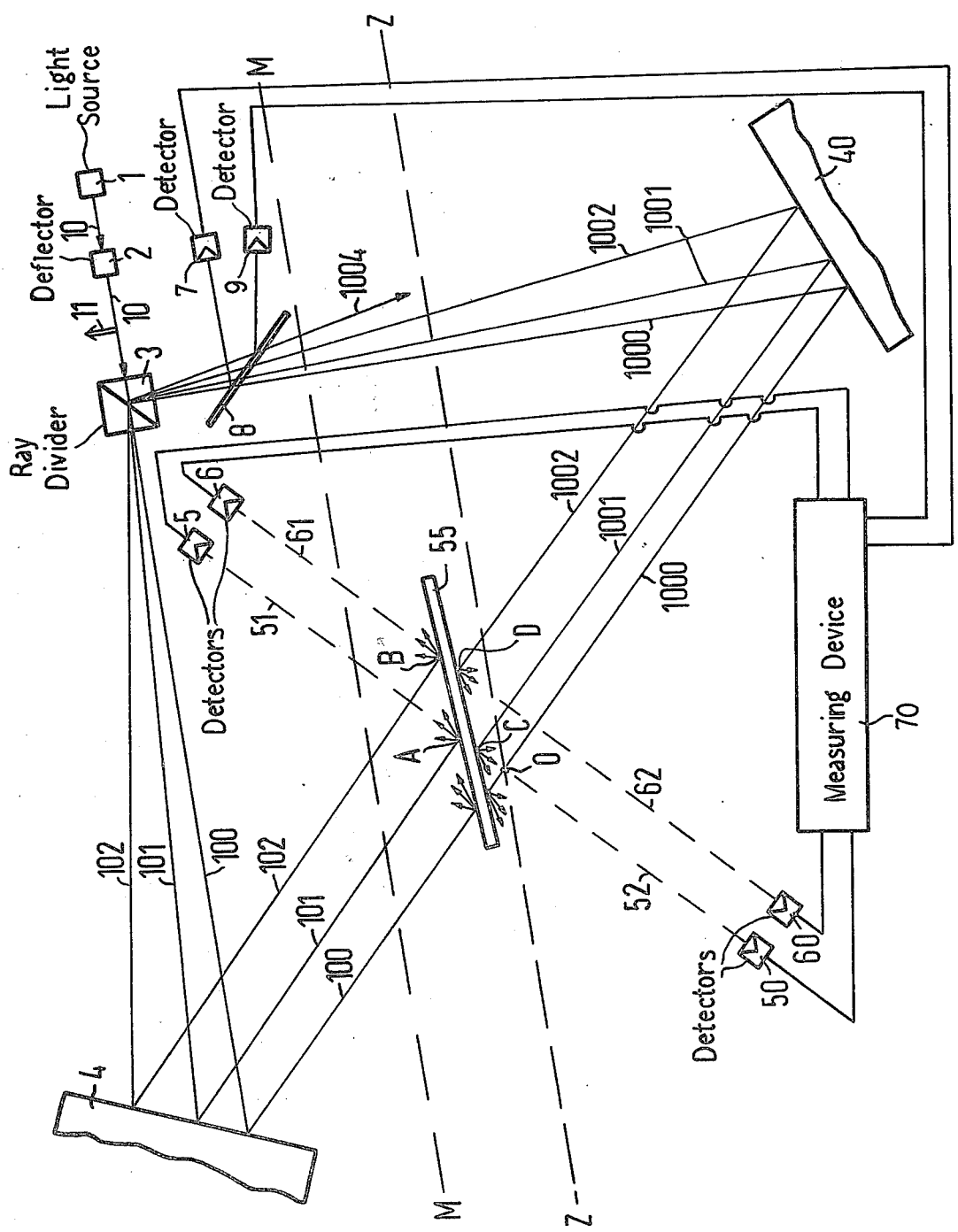

DEVICE FOR CONTACT-FREE THICKNESS MEASUREMENT

RELATED APPLICATION

This application is a continuation-in-part of my copending application U.S. Ser. No. 647,669, filed Jan. 9, 1976, and which matured into U.S. Pat. No. 4,068,955 issued Jan. 17, 1978.

BACKGROUND OF THE INVENTION

The invention relates to a process and device for contact-free thickness measurement in which a light source produces a sharply bundled light ray, a light deflector and ray divider are provided so that at least two simultaneously and periodically deflectable light rays are generated, and where devices are provided with which one of these light rays can be projected on one surface of the object and another of these light rays on the opposite surface of the object. Furthermore, photodetectors are provided which can pick up light only along a predetermined sighting line. With these detectors, time points can be determined at which points on the object surfaces lying on the respective sighting lines are hit by light rays.

From U.S. Pat. No. 4,068,955, a corresponding process is known in which the thickness of a workpiece with plant parallel surfaces is measured in a contact-free way. To that end, laser beams are directed step-wise over the opposite surfaces of the workpiece, and are diffusely reflected therefrom. The reflected rays are then registered by detectors which can only record light from a certain direction. The positions of the surface points at which the reflected light rays are registered by the detectors are determined from the time differential between the beginning of the light ray deflection and the reception of a light signal in the corresponding detector. If several points are scanned on the workpiece surface, then the workpiece may be tilted with respect to a virtual plane of referece during the measurement. In this case it is possible to determine the thickness of the workpiece independent of the tilting.

According to the aforementioned application the laser beam is split up into two partial rays. In the process the one partial ray serves for scanning the top side of the workpiece and the other partial ray serves for scanning the underside of the workpiece. In order to respectively positionally determine several points on the top or bottom side of the workpiece, these partial rays are split up into additional partial rays by prisms.

SUMMARY OF THE INVENTION

An object of the invention is to simplify the above described process.

This objective is accomplished by means of a device in which a first detector is provided for picking up light along a first sighting line which intersects the object at a first point on one surface thereof. The first detector detects a time $t_A$ when a first light ray strikes the first point. Second and third detectors are also provided. The second detector picks up light along a second sighting line which intersects the object at a second point on the one surface of the object. The second detector detects a time $t_B$ when a second light ray strikes a second point. The third detector picks up light along a third sighting line which intersects the object at a third point on the opposite surface thereof. The third detector detects a third time $t_C$ when a third light ray strikes the third point. A measurement device computes the time differences relative to the reference time and computes distances of the first through third points on the object from a reference plane. From this, the thickness of the object is determined in accordance with the procedures set out in U.S. Pat. No. 4,068,955.

According to the invention, therefore, the splitting up of the partial rays into further partial rays is superfluous.

BRIEF DESCRIPTION OF THE DRAWING

The drawing illustrates in schematic form the device of this invention.

DESCRIPTION OF THE PREFERRED EMBODIMENTS

The inventive device has a light source which generates a sharply bundled light ray. For a light source of this kind a continuous-wave laser is particularly suitable.

The light ray 10 generated by a light source 1 falls on a ray deflector 2, where it is periodically deflected as is symbolized by the arrow 11.

As the light deflector 2 the deflection device which is described in U.S. Pat. No. 3,902,783 issued Sept. 2, 1975, is especially suitable. This known device generates large deflection angles. In addition it is advantageous that the resonance frequency at which this device is operated is relatively stable.

A ray divider 3 is arraged behind the light deflector. With it the light ray 10 is divided up into two light rays with about equal intensity. On the one hand, therefore, light rays 100, 101, 102 are generated, corresponding to the deflection direction of the light ray 10 and on the other hand, light rays 1000, 1001, 1002 are correspondingly generated. The light rays 100 and 1000 correspond to a predetermined zero position of the light deflector.

A semipermeable mirror, for example, can serve as the ray divider 3.

The light rays 100 to 102 are directed by a fixed mirror 4 onto an object 55, whose thickness is to be measured. The light rays 1000 to 1002 are directed by a fixed mirror 40 onto this object.

This object must be situated within the measurement range.

The latter is limited on the one hand by the zero plane, which is designated with ZZ, and on the other hand by a plane which delimits the measurement range and is designated with MM.

Photodetectors 5, 6, 50 and 60 are arranged outside the measurement region. These detectors have directional screens so that they can only pick up light from one direction. This is symbolized by corresponding sighting lines 51, 52, 61 and 62.

The sighting lines of detectors 5 and 6 must lie in the same plane as the light rays 100, 101, 102 reflected by the mirror 4. The sighting lines of detectors 50 and 60 must lie in the same plane as the light rays 1000, 1001, 1002 reflected by the mirror 40.

The sighting line 51 encounters the object 55 at point A; the sighting line 61 at point B; the sighting line 52 at point C; and the sighting line 62 at a point D.

As soon as points A, B, C and D are struck by a light ray, this is registered by one of the detectors 5, 6, 50, 60. Since every object always diffusely reflects a portion of the incident light, it is not necessary that the light ray and the corresponding sighting lines have the same angle with respect to the normal line of the surface of the object. The object can therefore occupy any desired position within the measurement range. In any case, the detectors register the point of time at which the points A, B, C, D are struck by light rays.

At a predetermined zero position of the light deflector 2, the light rays 100 and 1000 are generated. These light rays meet one another at a point 0 on the zero plane, as long as there is no object situated in the measurement range.

At a later point in time corresponding to the deflection movement of the light deflector, there arise, on the one hand, the light rays 101, 102 and, on the other hand, the light rays 1001, 1002. This step is repeated periodically, corresponding to the periodic movement of the light deflector.

The points in time at which the light deflector assumes the zero position are designated with $t_0$. For the registration of these points in time it is possible in a simple manner to provide a photodetector 7 into which a small portion of the light ray 1000 is introduced by means of a glass plate 8. This glass plate also extracts a weak light ray from the later light rays 1001 and 1002; however, the detector 7 is not struck by these weak light rays.

The detector 7 can also be used simultaneously for the counting of the deflection frequency of the light rays.

In order to be able to check out the deflection speed, a further detector 9 can be provided which is struck by a weak light ray at a later point in time when a light ray 1004 is produced. This weak light ray can, in turn, be extracted out of the light ray 1004 by means of the glass plate 8.

The time difference between time point $t_0$, which is signaled by the detector 7, ad the time point at which the detector 9 is struck by the light ray is therefore a measure of the deflection speed of the light deflector. If the deflection frequency is known, then this time difference is additionally a measure of the deflection amplitude of this light deflector.

Thus it is possible for the deflection motion of the light deflector to be monitored or, respectively, to be measured by means of detectors 7 and 9.

Fundamentally, this deflection motion can also be measured or, respectively, monitored in other ways. However, the manner presented is especially simple.

The measurement of the thickness of the object 55 now occurs in the following manner. At a time $t_0$ registered by detector 7, the object is struck on its top side by the light ray 100 and on its bottom side by the light ray 1000. At the points of incidence the light rays are diffusely reflected, as is indicated by arrows. Since the points of incidence are situated outside the sighting lines 51, 52, 61, 62 of the detectors 5, 6, 50, 60, no signal is generated by these detectors.

At a later time point $t_A$ the object is struck on its top side at point A by light ray 101. This light ray is diffusely reflected by the object. Since the point A lies on the sighting line 51 of the detector 5, the time point $t_A$ is therefore registered by this detector. The time difference $t_0-t_A$ is, in the process, a measure of the distance of the point A from the zero plane ZZ.

At a still later time point $t_B$ the object is struck at point B by the light ray 102. This light ray is diffusely reflected by the object. Since the point B lies on the sighting line 61 of the detector 6, the time point $t_B$ is registered by this detector 6. In the process, the time differential $t_0-t_B$ is a measure of the distance of point B from the zero plane ZZ.

In a corresponding manner the underside of the object 55 is scanned.

At a time point $t_C$ the point C is struck by the light ray 1001. This light ray is diffusely reflected by the object. Since the point C lies on the sighting line 52 of the detector 50, the time point $t_C$ is registered by this detector 50. The time differential $t_0-t_C$ is, in the process, a measure of the distance of the point C from the zero plane ZZ.

At a late time point $t_D$ the point D is hit by the light ray 1002; this light ray is diffusely reflected. Since the point D lies on the sighting line 62 of detector 60, the time point $t_D$ is registered by this detector 60. In the process, the time differential $t_0-t_D$ is a measure of the distance of point D from the zero plane ZZ.

From the position of points A, B, C, D with regard to the zero plane ZZ it is now possible to determine the thickness of the object. A measuring device 70 computes the distance from the zero plane ZZ and determines the thickness of the object as described in detail in my U.S. Pat. No. 4,068,955 of which this is a continuation-in-part. In the process the object may be tilted (by an optional angle about an axis which is perpendicular to the plane of the figure).

In the figure all light rays and all sighting lines lie in the same plane. If, in the thickness measurement of the object, optional tiltings of the object around optional axes are to be permitted, then the plane which is formed by the sighting lines 51, 61 and by the light rays 100, 101, 102 reflected by the mirror 4 must be inclined with respect to the plane which is formed by the sighting lines 52, 62 and by the light rays 1000, 1001, 1002 reflected by the mirror 40. An inclination angle of 90°, i.e. the planes are perpendicular to one another, therefore is expedient. This is possible in a simple manner by a corresponding arrangement of the mirror 40 and the detectors 50, 60.

In this manner it is achieved that the path which the point of incidence of the light rays describes on the top side of the object, (this path is determined by the straight line through points A and B), is not parallel to the path which the point of incidence of the light rays describes on the bottom side of the object. This path on the bottom side is determined by the straight line through points C and D.

In the sample embodiment represented in the FIG., four detectors 5, 6, 50, 60 are provided for scanning of the object. It is also possible to provide a larger number of detectors which, in corresponding manner, register one after another the time points at which the object's surface points lying on the respective sighting line of the detectors are hit by the light ray. In this way it is possible on the one hand to increase the redundancy of the device; on the other hand it is also possible to measure complicated objects whose surfaces are not plane-parallel to one another.

With objects with plane-parallel surfaces, three of the detectors 5, 6, 50, 60 suffice in order to determine thickness of the object if this object is tilted, with respect to the zero plane, at most about one predetermined axis. In case the object's upper side is scanned by two detectors 5, 6 while the underside is scanned by only one of the detectors 50 or 60, this tilting axis must not lie in the plane which is established by the sighting lines 51 and 61. The corresponding case is true for the tilting axis and the plane which is established by the sighting lines 52 and 62, if the underside of the object is scanned by two detectors 50, 60 and the top side only by one of the detectors 5 or 6.

In case of optional tiltings of an object with plane-parallel surfaces, two detectors each, i.e. a total of four, are necessary for the top and bottom side of the object.

Although various minor modifications may be suggested by those versed in the art, it should be understood that I wish to employ within the scope of the patent granted hereon all such modifications as reasonably and properly come within the scope of my contribution to the art.

I claim as my invention:

1. A device for contact-free thickness measurement comprising means for contact-free thickness measurement of an object tilted relative to a reference plane, said means including:
   light source means for producing a sharply bundled light ray;
   a single light deflector means for deflecting the sharply bundled light ray and a single ray divider means for producing two simultaneously and periodically deflectable light rays to be guided over surfaces of the object;
   means for projecting one of the light rays on one surface of the object and the other of the light rays on an opposite surface of the object;
   reference detector means for determining a time $t_0$ at which said two rays corresponding to a zero position of the light deflector means strike the object;
   a first detector means for picking up light only along a first sighting line which intersects the object at a first point on one surface thereof, said first detector means detecting a time $t_A$ when a first of the two light rays strikes the first point;
   a second detector means for picking up light only along a second sighting line which intersects the object at a second point on said one surface thereof, said second detector means detecting a time $t_B$ when the first light ray strikes the second point;
   a third detector means for picking up light only along a third sighting line which intersects the object at a third point on the opposite surface thereof, said third detector means detecting a third time $t_C$ when a second of the two light rays strikes the third point; and
   a fourth detector means for picking up light only along a fourth sighting line which intersects the object at a fourth point on the opposite surface thereof, said fourth detector means detecting a fourth time $T_D$ when the second of the two light rays strikes the fourth point.

2. A device according to claim 1, characterized in that time measurement means are provided for measuring time differentials $t_0 - t_A$, $t_0 - t_B$ and $t_0 - t_C$.

3. A device according to claim 1, characterized in that said reference detecting means comprises a photodetector into which a partial ray can be introduced from one of said two rays which corresponds to the zero position of the light deflector means.

4. A device according to claim 1 in which the object has plane-parallel surfaces.

5. The device of claim 1 wherein each of the two light rays emerging from the ray divider are each totally by respective first and second reflectors directly onto the respective one surface and opposite surface of the object.

6. The device of claim 1 wherein the two light rays are the only light rays which scan the object.

7. A device for contact-free thickness measurement of an object, comprising:
   light source means for producing a sharply bundled light ray;
   a single light deflector means for deflecting the sharply bundled light ray and a single ray divider means for producing two simultaneously and periodically deflectable light rays for scanning surfaces of the object, the two light rays being the only light rays scanning the object;
   first and second means for respectively projecting the two light rays on opposite surfaces of the object;
   reference detecting means for determining a time $t_0$ at which the two rays corresponding to a reference position of the light deflector means strike the object;
   a first detector means for picking up light along a first sighting line which intersects the object at a first point on one surface thereof, said first detector means detecting a time $t_A$ when one of said two deflectable light rays strikes the first point;
   a second detector means for picking up light along a second sighting line which intersects the object at a second point on said one surface thereof, said second detector means detecting a time $t_B$ when said one of the deflectable light rays strikes the second point;
   a third detector means for picking up light along a third sighting line which intersects the object at a third point on the opposite surface thereof, said third detector means detecting a third time $t_C$ when the other of said two deflectable light rays strikes the third point;
   a fourth detector means for picking up light along a fourth sighting line which intersects the object at a fourth point on the opposite surface thereof, said fourth detector means detecting a fourth time $T_D$ when the other of said two deflectable light rays strikes the fourth point; and
   measuring means connected to the reference, first, second third and fourth detecting means for computing distances of the first, second, and third points from a reference plane and for computing a thickness of the object therefrom where said object has plane parallel sides and the sides are not parallel to the reference plane.

8. A device according to claim 7 in which a zero reference plane is provided and said first and second means for projecting project said two light rays so as to intersect the reference plane at a common point at $t_0$.

9. The device of claim 7 wherein each of the two light rays emerging from the ray divider are each totally reflected by respective first and second reflectors directly onto the respective one surface and opposite surface of the object.

* * * * *